United States Patent
Becker et al.

(10) Patent No.: US 7,703,284 B2
(45) Date of Patent: Apr. 27, 2010

(54) SUPERCHARGING SYSTEM FOR TWO-STAGE SUPERCHARGING OF V-TYPE INTERNAL COMBUSTION ENGINES

(75) Inventors: Bodo Becker, Oberlaindern (DE); Guenther Vogt, Holzkirchen (DE); Oliver Cocca, München (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 11/818,003

(22) Filed: Jun. 12, 2007

(65) Prior Publication Data
US 2008/0034752 A1    Feb. 14, 2008

(30) Foreign Application Priority Data
Jun. 12, 2006    (DE) .................... 10 2006 027 117

(51) Int. Cl.
F02B 33/44 (2006.01)
F02B 33/00 (2006.01)
F02B 29/04 (2006.01)
F02B 37/013 (2006.01)
F02B 37/00 (2006.01)
F02B 37/007 (2006.01)
F01N 1/00 (2006.01)

(52) U.S. Cl. ..................... 60/612; 60/323; 123/562; 123/563

(58) Field of Classification Search ............ 60/612, 60/323; 123/562–563; 73/118.1; F02B 29/04, F02B 37/013, 37/007, 37/00
See application file for complete search history.

(56) References Cited

U.S. PATENT DOCUMENTS

| 4,563,132 | A | * | 1/1986 | Grimmer ................. 60/612 |
| 4,709,552 | A | * | 12/1987 | Rutschmann et al. ......... 60/612 |
| 5,199,261 | A | * | 4/1993 | Baker .................... 60/612 |
| 5,784,882 | A | * | 7/1998 | Bonny et al. ............... 60/323 |
| 7,434,390 | B2 | * | 10/2008 | Nording et al. .............. 60/323 |
| 2003/0159443 | A1 | * | 8/2003 | Huter ..................... 60/612 |
| 2005/0097945 | A1 | * | 5/2005 | Flores et al. ............. 73/118.1 |
| 2006/0021347 | A1 | * | 2/2006 | Sun et al. ................ 60/612 |
| 2009/0183506 | A1 | * | 7/2009 | Trombetta et al. ........... 60/612 |

FOREIGN PATENT DOCUMENTS

DE    10060690 A1 *  6/2002
EP    0 718 481       6/1996

OTHER PUBLICATIONS

Bosch, Kraftfahrtechnisches Taschenbuch [Automotive Handbook], 23rd Edition, Vieweg, 1999, pp. 445 and 446.

* cited by examiner

Primary Examiner—Thai Ba Trieu
(74) Attorney, Agent, or Firm—Kenyon & Kenyon LLP

(57) ABSTRACT

A supercharging system, in particular an at least two-stage supercharging system, including a first stage and a second stage for an internal combustion engine having two cylinder banks. The at least two-stage supercharging system includes at least two charge air coolers. An exhaust gas turbocharger representing the first stage and an exhaust gas turbocharger representing the second stage are each situated next to one of the cylinder banks of the internal combustion engine.

21 Claims, 3 Drawing Sheets

SUPERCHARGING SYSTEM FOR TWO-STAGE SUPERCHARGING OF V-TYPE INTERNAL COMBUSTION ENGINES

BACKGROUND INFORMATION

The power limits of a supercharging system such as an exhaust gas turbocharger are increased, for example by regulated two-stage supercharging, as is known from Bosch, Kraftfahrtechnisches Taschenbuch [Automotive Handbook], $23^{rd}$ Edition, Vieweg, 1999, pages 445 through 446. In regulated two-stage supercharging, two exhaust gas turbochargers of different sizes are connected in series. The exhaust gas mass flow first flows into an exhaust gas manifold. From there, the exhaust gas mass flow is expanded via a high pressure turbine. In the case of large exhaust gas volumes, which can occur at high speeds, a portion of the exhaust gas mass flow may be redirected around the high pressure turbine via a bypass. The entire exhaust gas mass flow is subsequently used by a low pressure turbine connected downstream from the high pressure turbine. The incoming fresh air mass flow is first precompressed by a low pressure stage and then further compressed in the high pressure stage. Ideally, the fresh air mass flow undergoes intermediate cooling between the low pressure stage and the high pressure stage.

At approximately 50% to 60% of the nominal speed, the exhaust gas is completely redirected around the high pressure turbine via a bypass. As a result, the high pressure compressor, which is driven by the high pressure turbine and is connected in series to a low pressure compressor driven by the low pressure turbine, is simultaneously taken out of operation. In this case, the high pressure compressor is bypassed via a charge air line in which a nonreturn valve is provided to prevent charge air from flowing back via the charge air line during operation of the high pressure compressor.

Two-stage supercharging in a supercharging system is generally carried out by two series-connected exhaust gas turbochargers. This achieves a two-stage expansion via the two turbine parts of the two exhaust gas turbochargers as well as a two-stage compression on the compressor side of the two series-connected exhaust gas turbochargers. The disadvantages of unregulated two-stage supercharging are avoided by regulating devices for bypassing the high pressure turbine and high pressure compressor.

Cutting off the exhaust gas mass flow upstream from the high pressure turbine regulates the power of the high pressure turbine. The exhaust gas mass flow leaving the high pressure turbine mixes with a portion of the exhaust gas mass flow flowing through the bypass valve and is subsequently expanded in the low pressure turbine. A disadvantage of this procedure is the fact that the difference in pressure present between the outlet side of the internal combustion engine and the output of the high pressure turbine is expanded by a bypass valve without reducing work. In the case of unregulated two-stage supercharging, the fact that the entire exhaust gas mass flow is expanded in an unregulated manner in the high pressure and low pressure turbines is disadvantageous. This means that the power of the two-stage supercharging system rises in an unregulatable manner between a specific load point and the maximum load point, which is unsuitable for use in an internal combustion engine of a passenger car. Due to the design of the high pressure and low pressure turbines in the case of unregulated two-stage supercharging, an unsatisfactory response characteristic exists in the operating range up to and above the design point.

European Patent Application No. EP 0 718 481 relates to an exhaust gas recirculation system for a supercharged internal combustion engine. To lower exhaust emissions, in particular to substantially reduce $NO_x$ levels in the partial load range of the internal combustion engine, a method is known for recirculating a portion of the exhaust gas to suppress $NO_x$ formation by reducing the oxygen content. In supercharged engines, recirculating the exhaust gas directly results in a noticeable decrease in the power of the exhaust gas turbine. This decrease is even more pronounced in a two-stage supercharging system. To avoid power decreases of this type, which usually go hand-in-hand with increased fuel consumption, a method is described in which the exhaust gas to be recirculated is removed from between the high pressure turbine part and the low pressure turbine part and supplied to the inlet of the low pressure compressor which is higher in relation to the low pressure turbine. This ensures an exhaust gas recirculation method which minimizes increased fuel consumption.

The design of a two-stage supercharging system poses a particular difficulty in internal combustion engines having a V-shaped cylinder layout, because the two cylinder banks must be uniformly impinged upon by the turbochargers. If only one turbocharger is used as the high pressure stage and one turbocharger as the low pressure stage, the supercharging system may be positioned in front of or behind the internal combustion engine without taking up a lot of space. Although this provides a number of advantages, it nevertheless has the disadvantage that there is not always enough room in the engine compartment.

SUMMARY OF THE INVENTION

According to the present invention, the two stages of a two-stage supercharging system should each be accommodated on the side of an internal combustion engine, or a flat engine, having a V-shaped cylinder bank layout mounted in the longitudinal direction in relation to the vehicle. In the design according to the present invention, two embodiment variants are provided below, one embodiment variant representing a supercharging system having intermediate cooling and the other embodiment variant representing a supercharging system having no intermediate cooling.

In the two-stage supercharging system having intermediate cooling according to the present invention, the air compressed by the low pressure compressor of the two-stage supercharging system is precooled in a heat exchanger on the fresh air side. The heat exchanger may be conveniently accommodated in an advantageous manner in the wheel box located on the same side of the vehicle. Downstream from this intercooler, the intermediately cooled, precompressed fresh air may be supplied to a charge air cooler via both the high pressure compressor and a bypass line. The bypass line is advantageously released by an automatic compressor bypass.

The charge air cooler may be accommodated in a particularly advantageous manner in the area of a wheel box in the engine compartment. In the case of a two-stage supercharging system having no intermediate cooling, two charge air coolers are employed which are used for final cooling of the fresh air precompressed in the low pressure compressor and in the high pressure compressor before entering the combustion chambers of the internal combustion engine. In this embodiment variant, both charge air coolers may be parallel-connected in a particularly advantageous manner, which enables the pressure loss to be minimized on the fresh air side. Bypass valves may be used to cut off the flow through the two charge air coolers when, for example, the high pressure compressor is in use, and the pressure may be built up faster thereby due to smaller container volumes. According to the embodiment variant of the two-stage supercharging system having no intermediate cooling, the two exhaust gas turbochargers may also be positioned to the left and right of the internal combustion engine. The exhaust gas manifolds of the internal combustion engine are connectable to each other via a common exhaust gas line.

According to a preferred embodiment of the above-outlined embodiment variant of the supercharging system according to the present invention for internal combustion engines having V-shaped cylinder bank layouts or designed as flat engines, the supercharging systems are connected to the relevant cylinder bank as far to the front or rear as possible, i.e., viewed in relation to the direction of vehicle travel, on an end face of the engine (in front) or a back end of the engine (in the rear). This results in short exhaust gas pipes leading to the cylinder banks, and minimal flow losses as a consequence thereof, as well as an end-face surface that dissipates little heat. In a preferred embodiment with regard to the efficiency of the overall system, a thermally insulated design of the exhaust gas system, in particular of connecting lines, is provided, using air gap insulated pipes between the supercharging systems and the cylinder banks. The design according to the present invention supports the shortest possible connecting pipes so that the flow losses may be kept within narrow limits.

DETAILED DESCRIPTION

Figure 1:
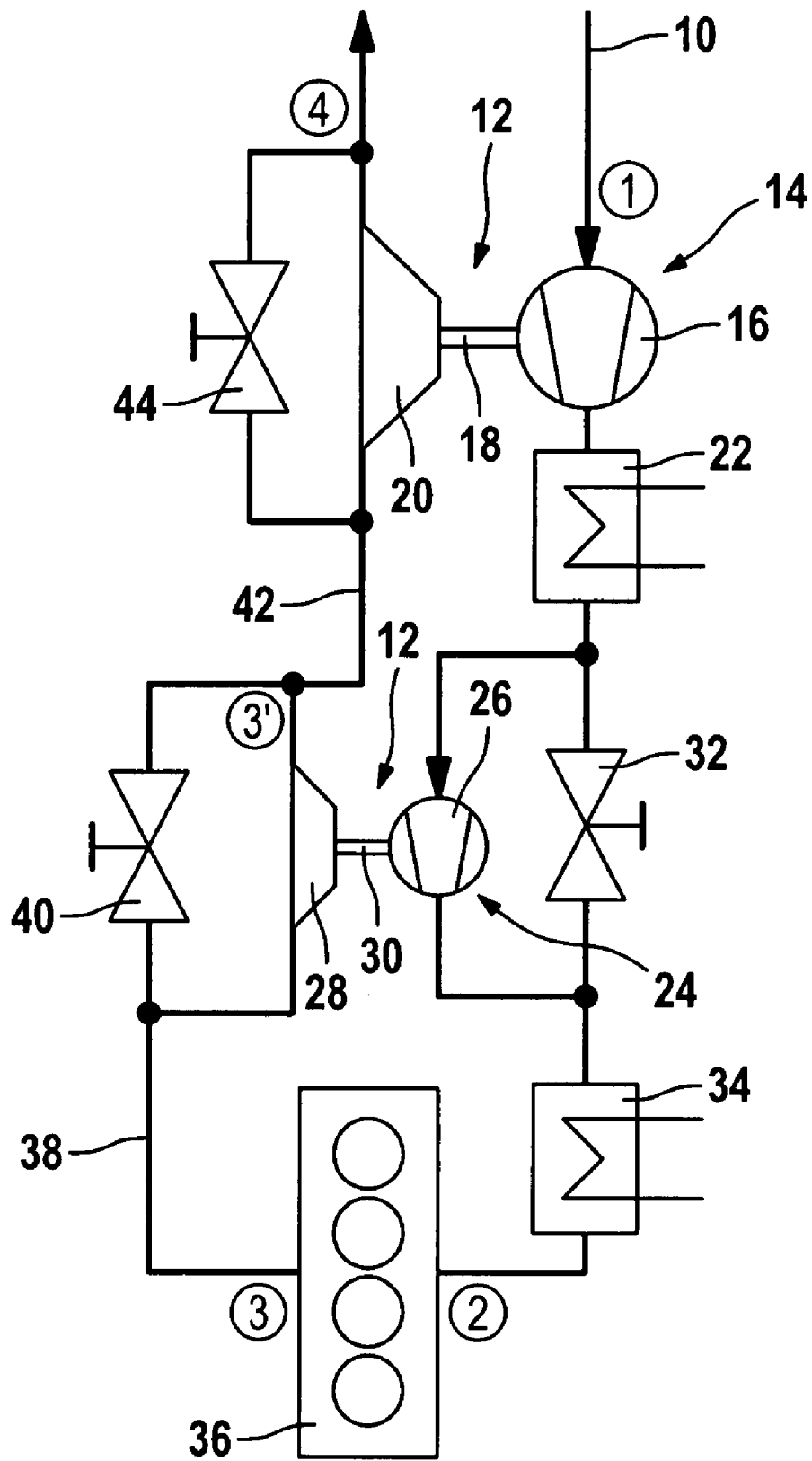
FIG. 1 shows a schematic illustration of a two-stage supercharging system including regulation.

The illustration according to FIG. 1 shows a schematic flow chart of a regulated two-stage supercharging system.

According to the illustration in FIG. 1, a two-stage supercharging system 12 has a first exhaust gas turbocharger 14 and a second exhaust gas turbocharger 24. Fresh air 10, which has a state (1), is compressed via a low pressure compressor part 16 of first exhaust gas turbocharger 14. The precompressed fresh air is cooled in a first charge air cooler 22 connected downstream from low pressure compressor part 16 of first exhaust gas turbocharger 14. In addition to low pressure compressor part 16, first exhaust gas turbocharger 14 also includes a low pressure turbine part 20 which is coupled with low pressure compressor part 16 via a shaft. After passing through first charge air cooler 22, the precompressed fresh air flows to a high pressure compressor part 26 of a second exhaust gas turbocharger 24. High pressure compressor part 26 of second exhaust gas turbocharger 24 may also be bypassed via a first bypass 32, so that the precompressed fresh air flows directly to a second charge air cooler 34 in which the precompressed fresh air is recooled.

If the precompressed fresh air cooled in first charge air cooler 22 is supplied to high pressure compressor part 26 of second exhaust gas turbocharger 24, the precompressed fresh air which was cooled in first charge air cooler 22 may be compressed again. In addition to high pressure compressor part 26, second exhaust gas turbocharger 24 also includes a high pressure turbine part 28. High pressure compressor part 26 and high pressure turbine part 28 of second exhaust gas turbocharger 24 are coupled with each other via a shaft 30.

A second charge air cooler 34 is connected downstream from first bypass 32 and high pressure compressor part 26, respectively. Either the fresh air which was recompressed in high pressure compressor part 26 of second exhaust gas turbocharger 24 or the precompressed fresh air passing through first bypass 32 is recooled in this second charge air cooler. On the inlet side of an internal combustion engine 36, the fresh air leaving second charge air cooler 34 assumes state (2). Exhaust gas leaves internal combustion engine 36 on the outlet side and assumes a state (3), the exhaust gas being supplied to the exhaust gas tract of internal combustion engine 36 via an exhaust line 38. The exhaust gas may be routed via either a second bypass 40 or high pressure turbine part 28 of second exhaust gas turbocharger 24. At the output of high pressure turbine part 28, the exhaust gas assumes state (3') before flowing to either low pressure turbine part 20 or a third bypass 44 via a supply line 42. After passing through low pressure turbine part 20, the exhaust gas assumes state (4), the pressure in state (4) being essentially equal to the ambient pressure.

Figure 2:
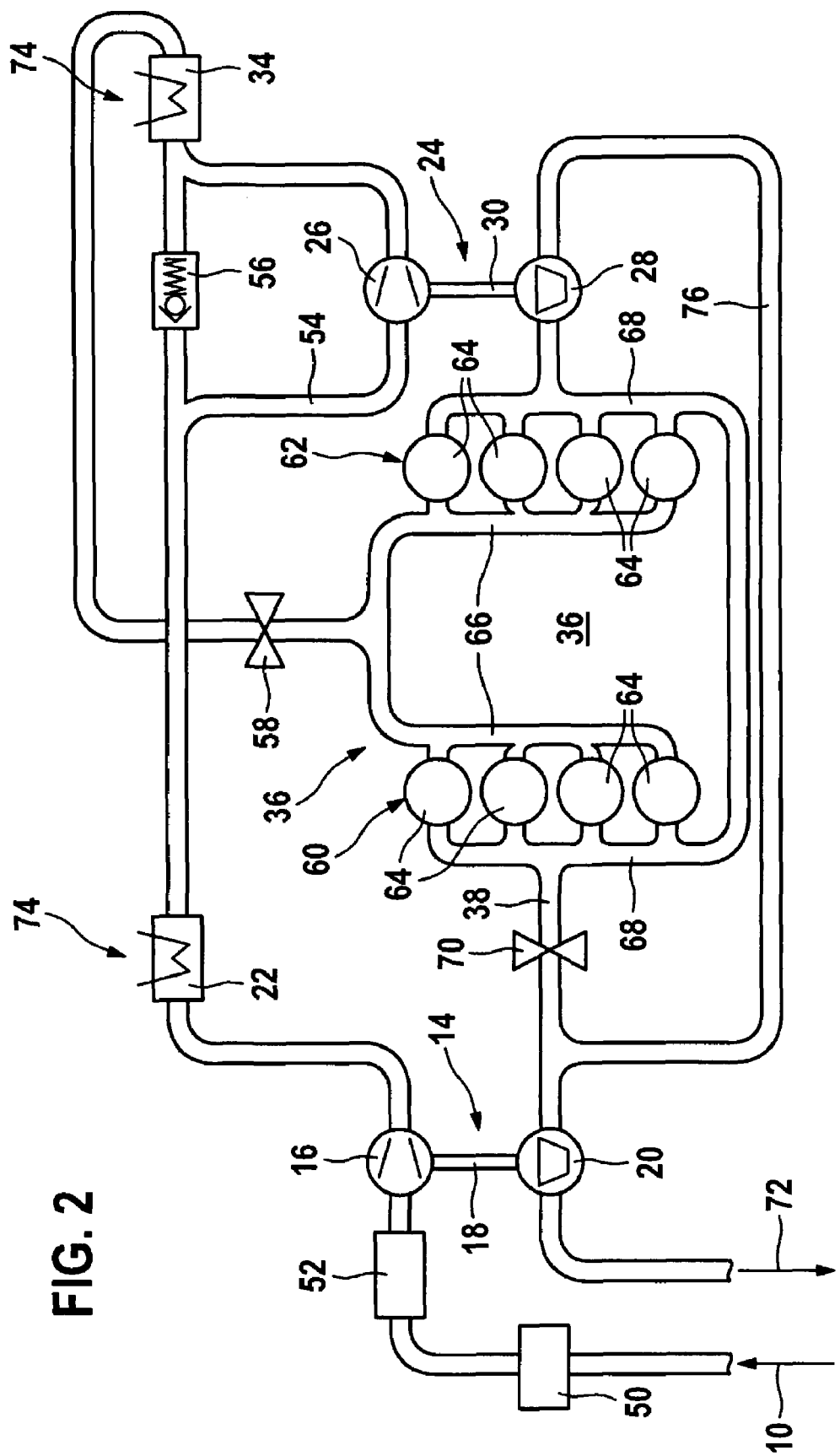
FIG. 2 shows a two-stage supercharging system including series-connected charge air coolers having intermediate cooling.

The illustration according to FIG. 2 shows a two-stage supercharging system for an internal combustion engine having at least two cylinder banks and including series-connected charge air coolers having intermediate cooling.

According to FIG. 2, fresh air 10 flows to an air filter 50, downstream from which a mass air flow meter 52 is connected. Fresh air 10 is precompressed in low pressure compressor part 16 of first exhaust gas turbocharger 14, low pressure compressor part 16 of first exhaust gas turbocharger 14 being coupled with low pressure turbine part 20 via shaft 18. The precompressed fresh air is cooled in first charge air cooler 22. The precompressed, cooled fresh air subsequently flows to high pressure compressor part 26 of second exhaust gas turbocharger 24 via a branch 54. High pressure compressor part 26 of second exhaust gas turbocharger 24 is connected to high pressure turbine part 28 via shaft 30 and driven via high pressure turbine part 28 of second exhaust gas turbocharger 24. The fresh air which was recompressed in high pressure compressor part 26 of second exhaust gas turbocharger 24 flows to second charge air cooler 34, in which the recompressed fresh air is cooled again. A valve 56, which is designed, for example, as a nonreturn valve, is provided between first charge air cooler 22 and second charge air cooler 34, which are situated in a series circuit 74, to prevent the fresh air which was recompressed in high pressure turbine part 26 of second exhaust turbocharger 24 from flowing back in the direction of first charge air cooler 22 before passing through second charge air cooler 34, so that pressure losses are avoided. The highly compressed fresh air which was recooled in second charge air cooler 34 flows to internal combustion engine 36 via a throttle device 58. Internal combustion engine 36 according to the illustration in FIG. 2 includes a first cylinder bank 60 and a second cylinder bank 62 according to the design principle of V-type engines. These are generally internal combustion engines 36 having 6, 8, 10, 12 or more cylinders which are used in high-performance passenger cars or commercial vehicles, including spark-ignition and auto-ignition internal combustion engines 36. The individual cylinders accommodated in cylinder banks 60 and 62, respectively, are identified by reference numeral 64. An inlet side on which the highly compressed and cooled fresh air enters the combustion chambers of cylinders 64 downstream from throttle device 58 is indicated by reference numeral 66 in the illustration according to FIG. 2, while reference numeral 68 identifies the outlet side where the exhaust gas leaves the combustion chambers of internal combustion engine 36. On the outlet side, internal combustion engine 36 having two cylinder banks 60, 62 includes exhaust gas manifolds which empty into a common exhaust gas line 38. Common exhaust gas line 38, which runs in the exhaust gas tract of the internal combustion engine, accommodates an exhaust gas regulating device 70, and a supply line which is connected downstream from high pressure turbine part 28 of second exhaust gas turbocharger 24 empties downstream from this exhaust gas regulating device. Low pressure turbine part 20 of first exhaust gas turbocharger 14, in which the exhaust gas is fully expanded and leaves the exhaust gas tract of the internal combustion engine in a cleaned and expanded state in the form of exhaust gas 72, which essentially has the ambient pressure level, is accommodated downstream from the point at which the supply line from high pressure turbine part 28 empties into exhaust gas line 38. The supply line from high pressure turbine part 28 of second exhaust gas turbocharger 24 to exhaust gas line 38 is identified by reference numeral 76 in the illustration according to FIG. 2.

In the two-stage supercharging system illustrated in FIG. 2, fresh air 10 flowing through low pressure compressor part 16 is precooled by first charge air cooler 22. This first charge air cooler may be conveniently accommodated in a particularly advantageous manner in front of or behind one of the wheel boxes in the area of the engine compartment located, for example, next to first cylinder bank 60. After leaving first charge air cooler 22, the precompressed fresh air may flow through both high pressure compressor part 26 of second exhaust gas turbocharger 24 and a bypass line, which is assigned to high pressure compressor part 26 and accommodates nonreturn valve 56. The bypass line accommodating nonreturn valve 56, which runs parallel to high pressure compressor part 26 of second exhaust gas turbocharger 24, may also be provided with an automatic compressor bypass. Second charge air cooler 34 may be advantageously accommodated in the area of the vehicle engine compartment facing second cylinder bank 62 of internal combustion engine 36. The two-stage supercharging system provided according to the present invention, including series-connected charge air coolers 22, 34 having intermediate cooling, may be advantageously accommodated in the vehicle so that first charge air cooler 22 and first exhaust gas turbocharger 14 are located adjacent to first cylinder bank 60 of internal combustion engine 36, while second exhaust gas turbocharger 24 and second charge air cooler 34 are situated on the side facing second cylinder bank 62 of internal combustion engine 36. Since the vehicle wheel boxes are connectable to the surroundings, accommodating series-connected first and second charge air coolers 22, 34 in the area of the wheel boxes for the front wheels in the engine compartment makes it possible to particularly effectively cool either fresh air 10 which was precompressed in low pressure compressor part 16 or the recompressed fresh air entering second charge air cooler 34. If exhaust gas regulating valve 70 is closed, the entire exhaust gas mass flow may be first supplied to high pressure turbine part 28 of second exhaust gas turbocharger 24.

A further connecting line 76 is routed around internal combustion engine 36 having two cylinder banks 60, 62 to supply the exhaust gas leaving high pressure turbine part 28 to low pressure turbine part 20 of first exhaust gas turbocharger 14. Low pressure turbine part 20 is situated on the side of internal combustion engine 36 where the latter's first cylinder bank 60 is located. An attempt should be made to keep the pipes, i.e., connecting line 76 from high pressure turbine part 28 to exhaust gas line 38 as well as the section of exhaust gas line 38 from outlet side 68 of internal combustion engine 36 to low pressure turbine part 20, as short as possible to keep flow losses to a minimum, in particular, to minimize the heat-dissipating surface of exhaust gas line 38 and connecting line 76, respectively. The thermally insulated design of the exhaust gas system, in particular of the connecting lines between the supercharging systems and the cylinder banks using air gap insulated pipes, is particularly advantageous for the embodiment variant of the two-stage supercharging system illustrated in FIG. 2. In the design according to the present invention, the connecting lines may be kept very short.

Figure 3:
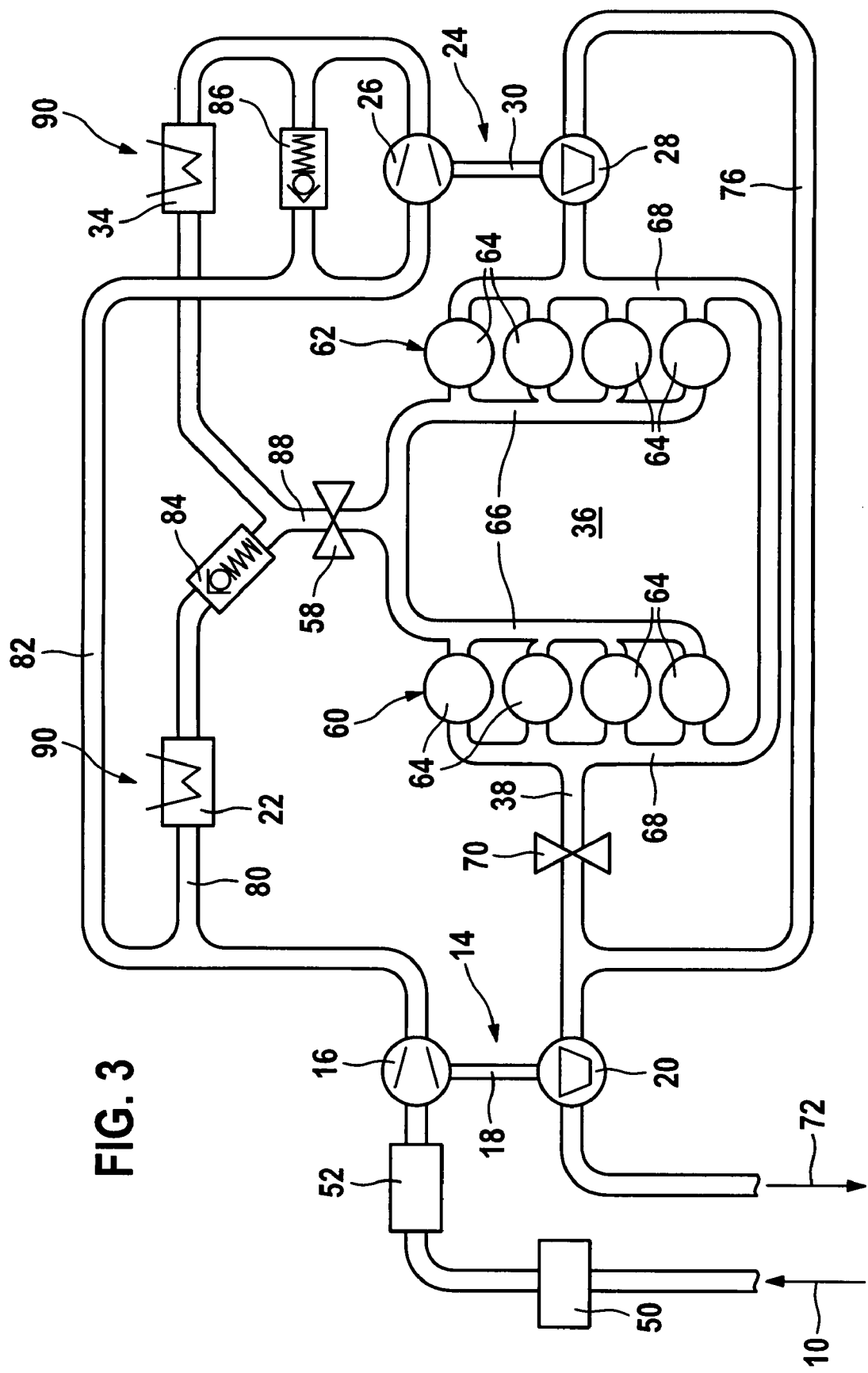
FIG. 3 shows a two-stage supercharging system including parallel-connected charge air coolers having no intermediate cooling.

The illustration according to FIG. 3 shows an embodiment variant of the two-stage supercharging system for internal combustion engines having two cylinder banks, in which the charge air coolers are parallel-connected and there is no intermediate cooling of the fresh air.

According to the embodiment variant illustrated in FIG. 3, fresh air 10 flows via air filter 50 and mass air flow meter 52 to low pressure turbine part 16 of first exhaust gas turbocharger 14. As illustrated in connection with FIG. 2, low pressure compressor part 16 of first exhaust gas turbocharger 14 is connected to low pressure turbine part 20 of first exhaust gas turbocharger 14 via shaft 18. On the one hand, precompressed fresh air 10 flows to high pressure compressor part 26 of second exhaust gas turbocharger 24 via a bypass line 82 and on the other hand passes, in part, through a branch 80, which runs to first charge air cooler 22. A first nonreturn valve 84 is connected downstream from first charge air cooler 22 for cooling precompressed fresh air 10. First nonreturn valve 84 performs a sequence valve function when the pressure loss in charge air cooler 34 increases. Fresh air 10 which was precompressed in low pressure compressor part 16 flows to a junction 88. The flow of precompressed fresh air passing through bypass line 82 flows to high pressure compressor part 26 of second exhaust gas turbocharger 24. A further, second nonreturn valve 86 is parallel-connected thereto. Second nonreturn valve 86 acts as a compressor bypass when low pressure compressor part 16 supplies an excessive air volume and high pressure compressor part 26 switches to "blocked mode."

Fresh air 10 which was recompressed in high pressure compressor part 26 is cooled in charge air cooler 34 connected downstream from high pressure compressor part 26 and supplied to junction 88, which is located upstream from throttle device 58. The highly compressed fresh air flow leaving second charge air cooler 34 and the portion of the fresh air flow which was cooled in first charge air cooler 22 via branch 80 mix in junction 88 and flow via first nonreturn valve 84 of junction 88. The illustration according to FIG. 3 shows that first charge air cooler 22 and second charge air cooler 34 are situated in a parallel circuit 90. Throttle device 58, via which the precompressed fresh air flows on inlet side 66 to cylinders 64 of first cylinder bank 60 and second cylinder bank 62 of internal combustion engine 36, is located downstream from junction 88 and upstream from internal combustion engine 36. When exhaust gas regulating valve 70 is closed, exhaust gas flows from outlet side 68 to high pressure turbine part 28 of second exhaust gas turbocharger 24 and is resupplied, via connecting line 76, to exhaust gas line 38 downstream from exhaust gas regulating valve 70 and upstream from low pressure turbine part 20 of first exhaust gas turbocharger 14. After the exhaust gas has been fully expanded in low pressure turbine part 20, exhaust gas 72 leaves the exhaust gas tract of the internal combustion engine at the ambient pressure level.

In the embodiment variant of the two-stage supercharging system according to the illustration in FIG. 3, first exhaust gas turbocharger 14 may be situated on the side of internal combustion engine 36 where first cylinder bank 60 is located. Likewise, second exhaust gas turbocharger 24 may be situated diametrically opposed to second cylinder bank 62 of internal combustion engine 36. An attempt should be made to keep both connecting line 76 to high pressure turbine part 28 of second exhaust gas turbocharger 24 to exhaust gas line 38 as well as exhaust gas line 38 to low pressure turbine part 20 as short as possible to minimize flow losses on the one hand and, to minimize the heat-dissipating surfaces of these pipes, i.e., exhaust gas line 38 and connecting line 76 on the other hand.

In the two-stage supercharging systems illustrated in FIGS. 2 and 3, providing the exhaust gas lines, i.e., pipes 76 and 38, with a thermally insulated design and using air gap insulated pipes have an advantageous effect on the efficiency of the overall system.

In the two embodiment variants according to FIGS. 2 and 3, exhaust gas turbochargers 14 and 24, respectively, should be situated as far as possible to the front or rear of cylinder banks 60, 62 of internal combustion engine 36 having a V-shaped cylinder layout. If both exhaust gas turbochargers 14 and 24 are located as close as possible to cylinder banks 60 and 62, respectively, their distance from one another is minimized and pipes 76 and 38 may be kept as short as possible. To utilize the compact mounting space in the engine compartment of a motor vehicle which includes an internal combustion engine 36 having a V-shaped cylinder layout, connecting line 76, which connects high pressure turbine part 28 of second exhaust gas turbocharger 24 to exhaust gas line 38 leading to low pressure turbine part 20 of first exhaust gas turbocharger 14, is routed in the engine compartment in such a way that pipes do not have to be routed beneath the oil pan of internal combustion engine 36.

What is claimed is:

1. A supercharging system for an internal combustion engine having two cylinder banks, comprising:
   at least two charge air coolers;
   a first exhaust gas turbocharger representing a first stage of the supercharging system;
   a second exhaust gas turbocharger representing a second stage of the supercharging system; and
   a first nonreturn valve;
   wherein:
      each of the first and second exhaust gas turbochargers is situated next to one of the cylinder banks of the internal combustion engine;
      the charge air coolers are situated in a parallel circuit, and partial flows of fresh air passing through them are combined at a junction connected upstream from a throttle device; and
      the first nonreturn valve is situated upstream from the junction in a branch downstream from a first of the charge air coolers.

2. The supercharging system according to claim 1, wherein the exhaust gas turbochargers each include a compressor part and a turbine part, and the turbine part of the second exhaust gas turbocharger is connected to an exhaust gas manifold via a connecting line.

3. The supercharging system according to claim 2, wherein the connecting line opens into the exhaust gas manifold downstream from a regulating device and upstream from the turbine part of the first exhaust gas turbocharger.

4. The supercharging system according to claim 2, wherein the exhaust gas turbochargers of the supercharging system are situated in an area of end faces of the internal combustion engine having two cylinder banks.

5. The supercharging system according to claim 2, wherein the connecting line and the exhaust gas manifold are designed as air gap insulated pipes.

6. The supercharging system according to claim 2, wherein, with respect to a longitudinal axis of a vehicle in which the supercharging system is included, the two cylinder banks are serially positioned between the first and second exhaust gas turbo chargers.

7. The supercharging system according to claim 1, wherein with respect to a longitudinal axis of a vehicle in which the supercharging system is included, the charge air coolers are situated in front of or in back of the cylinder banks.

8. The supercharging system according to claim 1, wherein the supercharging system is a two-stage supercharging system.

9. The supercharging system according to claim 1, further comprising a second nonreturn valve parallel-connected to a compressor part of the second exhaust gas turbocharger.

10. The supercharging system according to claim 9, wherein the exhaust gas turbochargers each include a compressor part and a turbine part, and the turbine part of the second exhaust gas turbocharger is connected to an exhaust gas manifold via a connecting line.

11. The supercharging system according to claim 10, wherein the connecting line opens into the exhaust gas manifold downstream from a regulating device and upstream from the turbine part of the first exhaust gas turbocharger.

12. The supercharging system according to claim 10, wherein the exhaust gas turbochargers of the supercharging system are situated in an area of end faces of the internal combustion engine having two cylinder banks.

13. The supercharging system according to claim 10, wherein the connecting line and the exhaust gas manifold are designed as air gap insulated pipes.

14. The supercharging system according to claim 9, wherein with respect to a longitudinal axis of a vehicle in which the supercharging system is included, the charge air coolers are situated in front of or in back of the cylinder banks.

15. The supercharging system according to claim 9, wherein the supercharging system is a two-stage supercharging system.

16. A supercharging system for an internal combustion engine having two cylinder banks, comprising:
   at least two charge air coolers;
   a first exhaust gas turbocharger representing a first stage of the supercharging system;
   a second exhaust gas turbocharger representing a second stage of the supercharging system; and
   a nonreturn valve;
   wherein:
      each of the first and second exhaust gas turbochargers is situated next to one of the cylinder banks of the internal combustion engine;
      the charge air coolers are situated in a parallel circuit, and partial flows of fresh air passing through them are combined at a junction connected upstream from a throttle device; and
      the nonreturn valve is parallel-connected to a compressor part of the second exhaust gas turbocharger.

17. The supercharging system according to claim 16, wherein the exhaust gas turbochargers each include a compressor part and a turbine part, and the turbine part of the second exhaust gas turbocharger is connected to an exhaust gas manifold via a connecting line.

18. The supercharging system according to claim 17, wherein the connecting line opens into the exhaust gas manifold downstream from a regulating device and upstream from the turbine part of the first exhaust gas turbocharger.

19. The supercharging system according to claim 17, wherein the exhaust gas turbochargers of the supercharging system are situated in an area of end faces of the internal combustion engine having two cylinder banks.

20. The supercharging system according to claim 17, wherein the connecting line and the exhaust gas manifold are designed as air gap insulated pipes.

21. The supercharging system according to claim 16, wherein the supercharging system is a two-stage supercharging system.

* * * * *